(12) United States Patent
Maejima

(10) Patent No.: US 11,104,782 B2
(45) Date of Patent: Aug. 31, 2021

(54) RUBBER COMPOSITION FOR USE IN TIRE TREAD

(71) Applicant: The Yokohama Rubber Co., LTD., Tokyo (JP)

(72) Inventor: Keisuke Maejima, Hiratsuka (JP)

(73) Assignee: The Yokohama Rubber Co., LTD.

( * ) Notice: Subject to any disclaimer, the term of this patent is extended or adjusted under 35 U.S.C. 154(b) by 209 days.

(21) Appl. No.: 15/301,711

(22) PCT Filed: Apr. 3, 2015

(86) PCT No.: PCT/JP2015/060597
§ 371 (c)(1),
(2) Date: Oct. 3, 2016

(87) PCT Pub. No.: WO2015/152398
PCT Pub. Date: Oct. 8, 2015

(65) Prior Publication Data
US 2017/0174876 A1 Jun. 22, 2017

(30) Foreign Application Priority Data
Apr. 3, 2014 (JP) .............................. JP2014-076804

(51) Int. Cl.
*C08L 9/06* (2006.01)
*B60C 1/00* (2006.01)
(Continued)

(52) U.S. Cl.
CPC .............. *C08L 9/06* (2013.01); *B60C 1/0016* (2013.01); *C08K 3/04* (2013.01); *C08K 3/36* (2013.01);
(Continued)

(58) Field of Classification Search
CPC .. C08L 9/00; C08L 2205/03; C08L 2205/025; C08L 9/06; C08L 7/00;
(Continued)

(56) References Cited

U.S. PATENT DOCUMENTS 3,858,776 A * 1/1975 Blackstone .......... H01B 15/001
225/2
5,780,538 A 7/1998 Cohen et al.
(Continued)

FOREIGN PATENT DOCUMENTS

| DE | 10 2010 062 557 | 9/2011 |
|---|---|---|
| JP | H10-251450 | 9/1998 |

(Continued)

OTHER PUBLICATIONS

Mark Alger, "Polymer Science Dictionary, 2nd Edition", Chapman & Hall, New York pp. 278-279, (1997).*
(Continued)

*Primary Examiner* — Alexander C Kollias
(74) *Attorney, Agent, or Firm* — Thorpe North & Western

(57) ABSTRACT

A rubber composition for use in a tire tread includes: per 100 parts by weight of diene rubber containing 40 wt % or greater of butadiene rubber, and a styrene butadiene rubber, from 80 to 150 parts by weight of silica having a CTAB specific surface area of 150 to 250 m$^2$/g, and a long chain alkyl group-containing silane compound in an amount of 1 to 10 wt % of the amount of the silica. The rubber composition further includes a styrene component in the diene rubber being from 15 to 20 wt %, and a vinyl component in the diene rubber being from 18 to 28 wt %; and an average glass transition temperature of the diene rubber is −55° C. or lower.

4 Claims, 1 Drawing Sheet

(51) Int. Cl.
  *C08K 3/04* (2006.01)
  *C08L 7/00* (2006.01)
  *C08L 47/00* (2006.01)
  *C08K 3/36* (2006.01)
  *C08K 5/548* (2006.01)
  *C08L 9/00* (2006.01)

(52) U.S. Cl.
  CPC .............. *C08K 5/548* (2013.01); *C08L 7/00* (2013.01); *C08L 9/00* (2013.01); *C08L 47/00* (2013.01); *C08K 2201/006* (2013.01); *C08L 2205/02* (2013.01); *C08L 2205/025* (2013.01); *C08L 2205/03* (2013.01); *C08L 2205/035* (2013.01)

(58) Field of Classification Search
  CPC .............. C08L 47/00; C08L 2205/02; C08L 2205/035; B60C 1/0016; B60C 1/00; C08K 2201/006; C08K 3/04; C08K 3/36; C08K 5/548; C08K 5/5419
  See application file for complete search history.

(56) References Cited

U.S. PATENT DOCUMENTS

| | | | |
|---|---|---|---|
| 5,914,364 A | 6/1999 | Cohen et al. | |
| 5,959,039 A * | 9/1999 | Yokoyama | B60C 1/00 525/236 |
| 6,221,943 B1 | 4/2001 | Hergenrother et al. | |
| 6,348,531 B1 | 2/2002 | Hergenrother et al. | |
| 6,384,118 B1 | 5/2002 | Hergenrother et al. | |
| 6,420,488 B1 * | 7/2002 | Penot | C08K 5/17 252/183.14 |
| 2003/0144394 A1 * | 7/2003 | Penot | C08K 5/3432 524/262 |
| 2004/0031548 A1 | 2/2004 | Amaddeo | |
| 2005/0119399 A1 * | 6/2005 | Nishioka | C08L 9/06 524/502 |
| 2007/0062624 A1 | 3/2007 | Amaddeo et al. | |
| 2011/0144236 A1 * | 6/2011 | Mihara | B60C 1/0016 523/158 |
| 2011/0245371 A1 | 10/2011 | Schweitzer et al. | |
| 2012/0234441 A1 * | 9/2012 | Mehlem | B60C 1/0016 152/151 |
| 2013/0172443 A1 * | 7/2013 | Kushida | B60C 1/00 523/156 |
| 2013/0331498 A1 | 12/2013 | Miyazaki | |

FOREIGN PATENT DOCUMENTS

| | | | |
|---|---|---|---|
| JP | H11-130874 | 5/1999 | |
| JP | 2004-513201 | 4/2004 | |
| JP | 2007-302813 | 11/2007 | |
| JP | 2009-029961 | 2/2009 | |
| JP | 2011-184546 | 9/2011 | |
| JP | 4883172 | 2/2012 | |
| JP | 2013-256585 | 12/2013 | |
| WO | WO 2002/036676 | 5/2002 | |
| WO | WO 2012/035998 | 3/2012 | |
| WO | WO-2012035998 | * 3/2012 | ............... C08L 9/06 |

OTHER PUBLICATIONS

International Search Report for International Application No. PCT/JP2015/060597 dated Jun. 23, 2015, 4 pages, Japan.

* cited by examiner

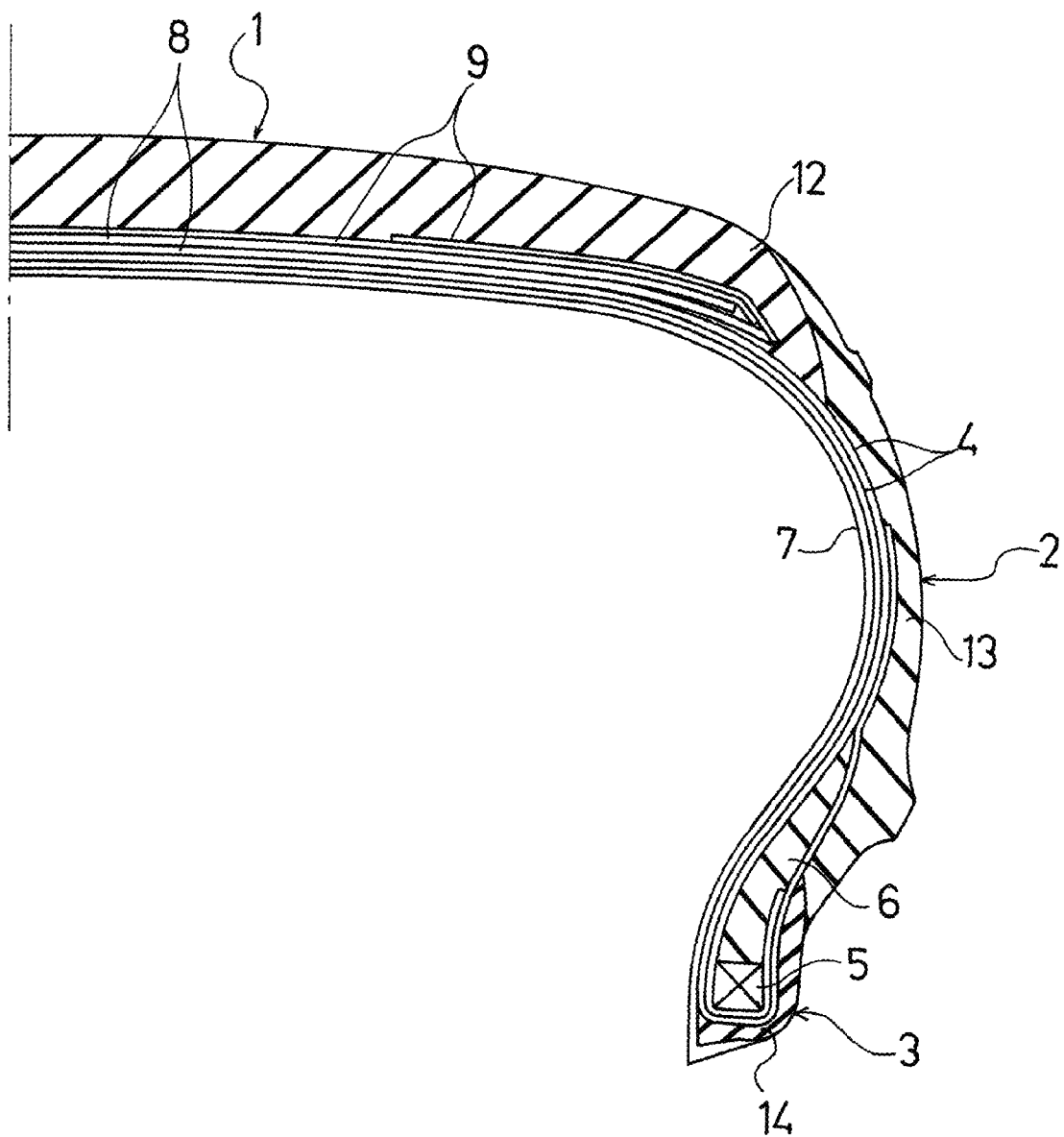

RUBBER COMPOSITION FOR USE IN TIRE TREAD

TECHNICAL FIELD

The present technology relates to a rubber composition for use in a tire tread which enhances performance on ice, wet performance, and wear resistance.

BACKGROUND ART

Pneumatic tires for use on icy and snowy roads (studless tires) and all-season tires are required to achieve a high degree of balance between performance on ice, wet performance, and wear resistance.

To enhance performance on ice, grip performance is enhanced by increasing adhesion force to icy and snowy road surfaces through pliably maintaining a hardness of a tread rubber, even at low temperatures. To ensure pliability in low temperature conditions, rubber components having a low glass transition temperature (Tg) are used.

At the same time, to enhance driving performance on wet road surfaces that have not been covered with snow or ice, high wet grip performance is required. Therefore, blending of a styrene butadiene rubber having a high Tg and/or silica is typically employed. However, when a styrene butadiene rubber having a high Tg is compounded, the Tg of the entire rubber composition increases, which leads to a problem of the adhesion force to icy and snowy road surfaces being negatively affected due to an increase in rubber hardness at low temperatures. Furthermore, silica causes a problem in that wear resistance cannot be obtained sufficiently since the reinforcing performance for rubber is inferior compared to that of carbon black.

Japanese Patent No. 4883172B proposes to enhance grip performance on icy and snowy road surfaces and wet road surfaces by compounding silica having a CTAB (cetyl trimethylammonium bromide) specific surface area of 80 to 170 $m^2/g$ and an aromatic modified terpene resin excluding terpene phenol resins in a diene rubber comprising a terminal-modified styrene butadiene rubber and a butadiene rubber, wherein a Tg of the butadiene rubber is from −55 to −70° C.

However, to satisfy the demands of consumers that request to achieve all the performance on ice, wet performance, and wear resistance at an even higher level, further enhancement is needed.

SUMMARY

The present technology provides a rubber composition for use in a tire tread which enhances performance on ice, wet performance, and wear resistance to or beyond conventional levels.

The rubber composition for use in a tire tread of the present technology that achieves the object described above comprising: per 100 parts by weight of diene rubber containing 40 wt % or greater of butadiene rubber, and a styrene butadiene rubber, from 80 to 150 parts by weight of silica having a CTAB specific surface area of 150 to 250 $m^2/g$, and a long chain alkyl group-containing silane compound in an amount of 1 to 10 wt % of the amount of the silica; a styrene component in the diene rubber being from 15 to 20 wt %, and a vinyl component in the diene rubber being from 18 to 28 wt %; and an average glass transition temperature of the diene rubber being −55° C. or lower.

The rubber composition for use in a tire tread of the present technology can enhance performance on ice, wet performance, and wear resistance to or beyond conventional levels since, in the rubber composition in which silica and a long chain alkyl group-containing silane compound are compounded in a diene rubber containing a butadiene rubber and a styrene butadiene rubber, the amounts of styrene component and vinyl component in the diene rubber are set to predetermined amounts, and an average glass transition temperature is set to a predetermined temperature.

At least a part of the butadiene rubber is preferably a pre-blended butadiene rubber in which from 60 to 80 wt % of high molecular weight polybutadiene having a weight average molecular weight of 500,000 to 1,000,000 and from 20 to 40 wt % of low molecular weight polybutadiene having a weight average molecular weight of 6,000 to 60,000 are mixed in a solvent, thereby further enhancing the wear resistance.

Furthermore, from 3 to 20 parts by weight of aromatic modified terpene resin excluding terpene phenol resin is preferably contained per 100 parts by weight of the diene rubber, thereby further enhancing wet performance.

Furthermore, the long chain alkyl group-containing silane compound is preferably an alkyltriethoxysilane having an alkyl group having from 7 to 20 carbons. The diene rubber can further contain a natural rubber. The CTAB specific surface area of the silica is more preferably set to 180 to 250 $m^2/g$.

BRIEF DESCRIPTION OF DRAWINGS

FIG. 1 is a partial cross-sectional view in a tire meridian direction illustrating an example of an embodiment of a pneumatic tire in which a rubber composition for use in a tire tread of the present technology is used.

DETAILED DESCRIPTION

FIG. 1 illustrates an example of an embodiment of a pneumatic tire in which a rubber composition for use in a tire tread is used. The pneumatic tire includes a tread portion 1, sidewall portions 2, and bead portions 3.

In FIG. 1, in a pneumatic tire, two layers of a carcass layer 4, formed by arranging reinforcing cords, which extend in a tire radial direction, in a tire circumferential direction at a predetermined pitch and embedding the reinforcing cords in a rubber layer, are disposed extending between the left and right side bead portions 3. Both ends of the carcass layer 4 are made to sandwich a bead filler 6 around a bead core 5 that is embedded in the bead portions 3 and are folded back in a tire axial direction from the inside to the outside. An innerliner layer 7 is disposed inward of the carcass layer 4. Two layers of a belt layer 8, formed by arranging reinforcing cords, which extend inclined in the tire circumferential direction, in the tire axial direction at a predetermined pitch and embedding these reinforcing cords in a rubber layer, are disposed on an outer circumferential side of the carcass layer 4 of the tread portion 1. The reinforcing cords of the two layers of the belt layer 8 intersect interlaminarly so that the directions of inclination with respect to the tire circumferential direction are opposite each other. The belt cover layer 9 is disposed on an outer circumferential side of the belt layer 8. The tread portion 1 is formed from a tread rubber layer 12 on an outer circumferential side of the belt cover layer 9. The tread rubber layer 12 is preferably composed of the rubber composition for use in a tire tread of the present technology. A side rubber layer 13 is disposed outward of the carcass layer 4 in each side wall portion 2, and a rim cushion rubber layer 14 is provided outward of the portion of the carcass layer 4 that is folded back around each of the bead portions 3. It should be noted that a studless tire is not limited to an embodiment of the pneumatic tire illustrated in FIG. 1 as an example.

The rubber composition for use in a tire tread of the present technology has a rubber component formed by a diene rubber. Furthermore, the diene rubber contains, as main components, a butadiene rubber and a styrene butadiene rubber. That is, the total amount of the butadiene rubber and the styrene butadiene rubber is 50 wt % or greater, preferably from 50 to 100 wt %, and more preferably from 90 to 100 wt %, per 100 wt % of the diene rubber. By using the butadiene rubber and the styrene butadiene rubber as the main components, performance on ice and wet performance can be further enhanced.

The content of the butadiene rubber is 40 wt % or greater, preferably from 40 to 60 wt %, and more preferably from 40 to 50 wt %, per 100 wt % of the diene rubber. By setting the content of the butadiene rubber to be 40 wt % or greater, performance on ice and wear resistance performance can be further enhanced.

The type of the butadiene rubber is not particularly limited, and butadiene rubbers that are typically used in rubber compositions for use in tires can be used. An example of the suitable butadiene rubber is a pre-blended butadiene rubber, and at least a part of the butadiene rubber is preferably a pre-blended butadiene rubber. The pre-blended butadiene rubber is a butadiene rubber in which from 60 to 80 wt % of high molecular weight polybutadiene having a weight average molecular weight of 500,000 to 1,000,000 and from 20 to 40 wt % of low molecular weight polybutadiene having a weight average molecular weight of 6,000 to 60,000 are mixed in a solvent. By compounding the pre-blended butadiene rubber, dispersibility of the silica in the rubber composition can be enhanced, and wet performance and wear resistance can be enhanced. Note that the solvent is not particularly limited as long as the solvent can dissolve a high molecular weight polybutadiene. A preferable example thereof is cyclohexane. Furthermore, the weight average molecular weight of the polybutadiene is measured by gel permeation chromatography (GPC) based on calibration with polystyrene standards.

The content of the styrene butadiene rubber is 60 wt % or less, preferably from 40 to 60 wt %, and more preferably from 50 to 60 wt %, per 100 wt % of the diene rubber. By setting the content of the styrene butadiene rubber to be 60 wt % or less, performance on ice and wear resistance performance can be further enhanced.

The type of the styrene butadiene rubber is not particularly limited, and solution polymerized styrene butadiene rubbers, emulsion polymerized styrene butadiene rubbers, and modified styrene butadiene rubbers formed by introducing a functional group to these styrene butadiene rubbers, which are typically used in rubber compositions for use in tires, can be used. Furthermore, various styrene butadiene rubber products having various styrene contents and vinyl contents are available. Among these, the styrene butadiene rubber can be appropriately selected in a manner that the amounts of the styrene component and the vinyl component in the diene rubber are adjusted as described below.

In the present technology, another diene rubber can be compounded besides the butadiene rubber and the styrene butadiene rubber. Examples of the other diene rubber include natural rubbers, isoprene rubbers, various butyl rubbers, and ethylene-propylene-diene rubbers. Among these, natural rubber is preferable. By compounding natural rubber as the other diene rubber, durability and wear resistance can be maintained. The content of the other diene rubber is preferably from 0 to 20 wt %, and more preferably from 0 to 15 wt %, per 100 wt % of the diene rubber.

In the rubber composition for use in a tire tread of the present technology, the diene rubber is formed from the butadiene rubber and styrene butadiene rubber, and, optionally, another diene rubber, and it is necessary to set the amount of the styrene component to 15 to 20 wt % and the amount of the vinyl component to 18 to 28 wt % per 100 wt % of the diene rubber.

The amount of the styrene component in the diene rubber is from 15 to 20 wt %, and preferably from 17 to 20 wt %. When the amount of the styrene component is less than 15 wt %, wet performance tends to deteriorate. Furthermore, when the amount of the styrene component is greater than 20 wt %, performance on snow and ice tends to deteriorate. The styrene component in the diene rubber is derived from the styrene segments of the styrene butadiene rubber.

The amount of the vinyl component in the diene rubber is from 18 to 28 wt %, and preferably from 24 to 28 wt %. When the amount of the vinyl component is less than 18 wt %, performance on snow and ice tends to deteriorate. Furthermore, when the amount of the vinyl component is greater than 28 wt %, wet performance tends to deteriorate. The vinyl component in the diene rubber is derived from the vinyl moieties of the styrene butadiene rubber, the vinyl moieties of the butadiene rubber, and the vinyl moieties of the other diene rubber that is optionally compounded, and the amount of the vinyl component in the diene rubber is the total amount of these vinyl moieties.

In the present technology, the average glass transition temperature of the diene rubber formed from the butadiene rubber, styrene butadiene rubber, and an optional other diene rubber is from $-55°$ C. or lower, and preferably from $-65°$ C. to $-55°$ C. By setting the average glass transition temperature of the diene rubber to be $-55°$ C. or lower, excellent performance on ice can be achieved by maintaining pliability and/or flexibility of the rubber compound in low temperature conditions to make adhesion force to ice surfaces high. Note that, for the glass transition temperature (Tg) of the diene rubber, a thermogram is obtained by differential scanning calorimetry (DSC) at a rate of temperature increase of $20°$ C./minute and the temperature at the midpoint of the transition region is defined as the glass transition temperature. When the diene rubber is an oil extended product, the glass transition temperature is the glass transition temperature of the diene rubber containing no oil-extending component (the oil). Furthermore, the average glass transition temperature can be determined by multiplying weight fractions of diene rubbers by corresponding glass transition temperatures of the diene rubbers and then summing up the obtained values (weighted average value of the glass transition temperatures). Note that the total of the weight fractions of the diene rubbers is 1.

The rubber composition for use in a tire tread of the present technology contains from 80 to 150 parts by weight of silica having a CTAB specific surface area of 150 to 250 $m^2/g$ per 100 parts by weight of the diene rubber described above. By compounding silica, performance on ice and wet performance can be further enhanced.

The CTAB specific surface area of the silica is from 150 to 250 $m^2/g$, preferably from 180 to 250 $m^2/g$, and more preferably from 190 to 230 $m^2/g$. When the CTAB specific surface area is less than 150 $m^2/g$, sufficient wet performance cannot be achieved and wear resistance is deteriorated. Furthermore, when the CTAB specific surface area is greater than 250 m²/g, mixability/processability of the silica is deteriorated. The CTAB specific surface area of the silica is a value measured in accordance with ISO 5794.

In the present technology, the compounded amount of the silica is from 80 to 150 parts by weight, preferably from 90 to 130 parts by weight, and even more preferably from 100 to 120 parts by weight, per 100 parts by weight of the diene rubber. When the compounded amount of the silica is less than 80 parts by weight, sufficient effect of enhancing performance on ice and wet performance cannot be achieved, and heat build-up is increased. Furthermore, when the compounded amount of the silica is greater than 150 parts by weight, performance on ice and wear resistance are deteriorated while heat build-up is increased.

In the present technology, a silane coupling agent is preferably compounded together with silica. By compounding the silane coupling agent, dispersibility of the silica in the diene rubber is enhanced, thereby achieving further effects of enhancing performance on ice and wet performance.

The type of the silane coupling agent is not particularly limited as long as it is a silane coupling agent that can be used in rubber compositions containing silica. Examples thereof include sulfur-containing silane coupling agents, such as bis(3-triethoxysilylpropyl)tetrasulfide, bis(3-triethoxysilylpropyl)disulfide, 3-trimethoxysilylpropyl benzothiazole tetrasulfide, γ-mercaptopropyl triethoxysilane, and 3-octanoylthiopropyl triethoxysilane.

The compounded amount of the silane coupling agent is preferably from 3 to 15 wt %, and more preferably from 5 to 10 wt %, relative to the weight of the silica. When the compounded amount of the silane coupling agent is less than 3 wt % of the compounded amount of the silica, dispersibility of the silica may not be sufficiently enhanced. When the compounded amount of the silane coupling agent is greater than 15 wt % of the compounded amount of the silica, the silane coupling agent condenses by itself, and desired hardness and/or strength of the rubber composition cannot be achieved.

By compounding a long chain alkyl group-containing silane compound, the rubber composition for use in a tire tread of the present technology suppresses aggregation of the silica and increase in the viscosity of the rubber composition, thereby further enhancing performance on ice, wet performance, and wear resistance.

The long chain alkyl group-containing silane compound is preferably an alkyltriethoxysilane having an alkyl group having from 7 to 20 carbons. Examples of the alkyl group having from 7 to 20 carbons include a heptyl group, octyl group, nonyl group, decyl group, undecyl group, dodecyl group, tridecyl group, tetradecyl group, pentadecyl group, hexadecyl group, heptadecyl group, octadecyl group, nonadecyl group, and icosyl group. Among these, from the perspective of miscibility with the diene rubber, an alkyl group having from 8 to 10 carbons is preferable, and an octyl group or nonyl group is even more preferable.

The long chain alkyl group-containing silane compound is contained in an amount of 1 to 10 wt %, and more preferably 3 to 8 wt %, relative to the weight of the silica. When the compounded amount of the long chain alkyl group-containing silane compound is less than 1 wt %, performance on ice and wear resistance are deteriorated while heat build-up is increased. Furthermore, when the compounded amount of the long chain alkyl group-containing silane compound is greater than 10 wt %, wet performance and wear resistance are deteriorated.

The rubber composition for use in a tire tread of the present technology may contain an aromatic modified terpene resin excluding terpene phenol resin per 100 parts by weight of the diene rubber. By compounding the aromatic modified terpene resin, wet performance and wear resistance can be enhanced. However, when only a terpene phenol resin is compounded, performance on ice is deteriorated since flexibility in low temperature conditions is impaired. The aromatic modified terpene resin is obtained by polymerizing a terpene and an aromatic compound that does not include phenol. Examples of the terpene include α-pinene, β-pinene, dipentene, and limonene. Examples of the aromatic compound include styrene, α-methylstyrene, vinyl toluene, and indene. Such aromatic modified terpene resins enhance wet performance due to excellent miscibility with the diene rubber.

A compounded amount of the aromatic modified terpene resin is from 3 to 20 parts by weight and preferably from 5 to 20 parts by weight per 100 parts by weight of the diene rubber. When the compounded amount of the aromatic modified terpene resin is less than 3 parts by weight, wet performance cannot be sufficiently enhanced. Furthermore, when the compounded amount of the aromatic modified terpene resin is greater than 20 parts by weight, wet performance can be enhanced but performance on ice and snow is deteriorated, which is not preferable.

The rubber composition for use in a tire tread may also contain another reinforcing filler other than the silica. Examples of another reinforcing filler include carbon black, clay, mica, talc, calcium carbonate, aluminum hydroxide, aluminum oxide, and titanium oxide. Among these, carbon black is preferable.

By compounding carbon black, hardness, strength, and wear resistance of the rubber composition can be enhanced. The compounded amount of the carbon black is preferably from 5 to 40 parts by weight, and more preferably from 5 to 20 parts by weight, per 100 parts by weight of the diene rubber.

The rubber composition for use in a tire tread may also contain various compounding agents that are commonly used in rubber compositions for use in tire treads. Examples thereof include vulcanization or cross-linking agents, vulcanization accelerators, antiaging agents, plasticizers, processing aids, liquid polymers, and thermosetting resins. These compounding agents can be kneaded by a common method to obtain a rubber composition that can then be used for vulcanization or cross-linking. These compounding agents can be compounded in typical amounts conventionally used so long as the objects of the present technology are not hindered. The rubber composition for use in a tire tread can be produced by kneading and mixing the components described above using a publicly known rubber kneading machine, such as a Banbury mixer, a kneader, a roller, or the like.

The present technology is further described below using examples. However, the scope of the present technology is not limited to these examples.

EXAMPLES

Sixteen types of rubber compositions for use in tire treads (Working Examples 1 to 8 and Comparative Examples 1 to 8) were prepared according to the formulations shown in Tables 1 and 2 with the compounding agents shown in Table 3 used as common components. With the exception of the sulfur and the vulcanization accelerators, the components were kneaded in a 1.7 L sealed Banbury mixer for 5 minutes.

The mixture was then extruded as a master batch and cooled at room temperature. The master batch was placed in the 1.7 L sealed Banbury mixer again, and the sulfur and the vulcanization accelerators were then added to the master batch and mixed to produce a rubber composition for use in a tire tread.

Note that, in the rows of "Styrene butadiene rubber (SBR)" in Tables 1 and 2, the net compounded amount, except the amount of the oil-extending component, of SBR is written in parentheses in addition to the compounded amount of the product. Furthermore, the compounded amounts of the compounding agents shown in Table 3 are expressed as values in part by weight per 100 parts by weight of the diene rubbers shown in Tables 1 and 2. Furthermore, the amounts (wt %) of the styrene component and the vinyl component per 100 wt % of the diene rubber and the average glass transition temperature (Tg) of the diene rubber are shown in Tables 1 and 2.

The obtained 16 types of rubber compositions were press-vulcanized at 160° C. for 20 minutes in a predetermined mold to produce test pieces formed from the rubber compositions for use in tire treads. For the obtained test pieces, tan δ at 0° C. and tan δ at 60° C., frictional performance on ice (inside drum test on ice; μ lock), and wear resistance were evaluated by the method described below.

tan δ (0° C.) and tan δ (60° C.)

Using a viscoelastic spectrometer, manufactured by Toyo Seiki Seisaku-sho, Ltd., the values of tan δ at ambient temperatures of 0° C. and 60° C. were measured by measuring the dynamic visco-elasticity of the obtained test pieces under conditions at an initial strain of 10%, an amplitude of ±2%, and a frequency of 20 Hz. The obtained results were expressed as indexes with the values of Comparative Example 1 expressed as indexes of 100. In Tables 1 and 2, tan δ (0° C.) is shown in the rows of "Wet performance", and tan δ (60° C.) is shown in the rows of "Heat build-up". Larger values of wet performance indicate superior wet performance. Smaller values of heat build-up indicate lower rolling resistance and superior fuel consumption performance.

Wear Resistance

The amount of wear of the obtained test piece was measured in accordance with JIS (Japanese Industrial Standard) K6264, using a Lambourn abrasion test machine (manufactured by Iwamoto Seisakusho Co., Ltd.) under the following conditions: temperature=20° C., load=15 N, slip rate=50%, time=10 minutes. The obtained results are shown in the rows of "Wear resistance" in Tables 1 and 2 as indexes based on the reciprocal of the value of Comparative Example 1 expressed as an index of 100. Larger index values indicate superior wear resistance. Frictional Performance on Ice (Inside Drum Test on Ice; μ Lock)

The obtained test piece was bonded to a substrate rubber in the form of a flat column and the coefficient of friction on ice was determined by an inside drum-type friction on ice tester under conditions of a determination temperature of −1.5° C., a load of 5.5 kg/cm², and a drum rotation speed of 25 km/h. The obtained results are shown in the rows of "Performance on ice" in Tables 1 and 2 as indexes with the value of Comparative Example 1 expressed as an index of 100. Larger index values indicate superior performance on snow and ice.

TABLE 1

|  |  | Comparative Example 1 | Comparative Example 2 | Comparative Example 3 | Comparative Example 4 |
|---|---|---|---|---|---|
| SBR-1 | Part by weight | 82.5 (60) |  | 41.25 (30) | 41.25 (30) |
| SBR-2 | Part by weight |  | 82.5 (60) | 41.25 (30) | 41.25 (30) |
| BR-1 | Part by weight | 40 | 40 | 40 | 40 |
| Silica-1 | Part by weight |  |  | 100 |  |
| Silica-2 | Part by weight | 100 | 100 |  | 160 |
| Carbon black | Part by weight | 5 | 5 | 5 | 5 |
| Coupling agent | Part by weight | 9 | 9 | 9 | 14 |
| Alkylsilane | Part by weight | 3 | 3 | 3 | 3 |
| Oil | Part by weight | 30 | 30 | 30 | 30 |
| Styrene component amount in diene rubber | wt % | 24 | 15 | 20 | 20 |
| Vinyl component amount in diene rubber | wt % | 15 | 30 | 22 | 22 |
| Tg of diene rubber | ° C. | −55 | −56 | −55 | −55 |
| Wet performance | Index value | 100 | 96 | 97 | 125 |
| Heat build-up | Index value | 100 | 94 | 95 | 142 |
| Performance on ice | Index value | 100 | 109 | 112 | 90 |
| Wear resistance | Index value | 100 | 97 | 70 | 88 |

TABLE 1-continued

|  |  | Comparative Example 5 | Comparative Example 6 | Comparative Example 7 | Comparative Example 8 |
|---|---|---|---|---|---|
| SBR-1 | Part by weight | 41.25 (30) | 41.25 (30) | 41.25 (30) | 48.13 (35) |
| SBR-2 | Part by weight | 41.25 (30) | 41.25 (30) | 41.25 (30) | 48.13 (35) |
| BR-1 | Part by weight | 40 | 40 | 40 | 30 |
| Silica-1 | Part by weight |  |  |  |  |
| Silica-2 | Part by weight | 60 | 100 | 100 | 100 |
| Carbon black | Part by weight | 40 | 5 | 5 | 5 |
| Coupling agent | Part by weight |  | 9 | 9 | 9 |
| Alkylsilane | Part by weight | 3 |  | 12 | 12 |
| Oil | Part by weight | 30 | 30 | 30 | 30 |
| Styrene component amount in diene rubber | wt % | 20 | 20 | 20 | 23 |
| Vinyl component amount in diene rubber | wt % | 22 | 22 | 22 | 26 |
| Tg of diene rubber | ° C. | −55 | −55 | −55 | −46 |
| Wet performance | Index value | 89 | 100 | 95 | 107 |
| Heat build-up | Index value | 154 | 104 | 100 | 102 |
| Performance on ice | Index value | 97 | 92 | 107 | 91 |
| Wear resistance | Index value | 112 | 96 | 94 | 87 |

TABLE 2

|  |  | Working Example 1 | Working Example 2 | Working Example 3 | Working Example 4 |
|---|---|---|---|---|---|
| SBR-1 | Part by weight | 41.25 (30) |  | 34.38 (25) | 34.38 (25) |
| SBR-2 | Part by weight | 41.25 (30) | 41.25 (30) | 34.38 (25) | 34.38 (25) |
| SBR-3 | Part by weight |  | 37.5 (30) |  |  |
| SBR-4 | Part by weight |  |  | 10 |  |
| BR-1 | Part by weight | 40 | 40 | 40 | 40 |
| BR-2 | Part by weight |  |  |  |  |
| NR | Part by weight |  |  |  | 10 |
| Silica-2 | Part by weight | 100 | 100 | 100 | 100 |
| Carbon black | Part by weight | 5 | 5 | 5 | 5 |
| Coupling agent | Part by weight | 9 | 9 | 9 | 9 |
| Alkylsilane | Part by weight | 3 | 3 | 3 | 3 |
| Terpene resin | Part by weight |  |  |  |  |
| Oil | Part by weight | 30 | 33.75 | 30 | 30 |
| Styrene component amount in diene rubber | wt % | 20 | 18 | 19 | 17 |
| Vinyl component amount in diene rubber | wt % | 22 | 23 | 19 | 19 |
| Tg of diene rubber | ° C. | −55 | −58 | −59 | −60 |
| Wet performance | Index value | 100 | 100 | 100 | 100 |
| Heat build-up | Index value | 97 | 88 | 92 | 90 |
| Performance on ice | Index value | 104 | 105 | 108 | 111 |
| Wear resistance | Index value | 100 | 100 | 103 | 108 |

|  |  | Working Example 5 | Working Example 6 | Working Example 7 | Working Example 8 |
|---|---|---|---|---|---|
| SBR-1 | Part by weight | 34.38 (25) | 41.25 (30) | 41.25 (30) | 41.25 (30) |
| SBR-2 | Part by weight | 34.38 (25) | 41.25 (30) | 41.25 (30) | 41.25 (30) |
| SBR-3 | Part by weight |  |  |  |  |
| SBR-4 | Part by weight |  |  |  |  |
| BR-1 | Part by weight | 50 | 40 |  | 40 |
| BR-2 | Part by weight |  |  | 40 |  |
| NR | Part by weight |  |  |  |  |
| Silica-2 | Part by weight | 100 | 120 | 120 | 100 |
| Carbon black | Part by weight | 5 | 5 | 5 | 5 |
| Coupling agent | Part by weight | 9 | 9 | 9 | 9 |

TABLE 2-continued

| | | | | | |
|---|---|---|---|---|---|
| Alkylsilane | Part by weight | 3 | 3 | 3 | 3 |
| Terpene resin | Part by weight | | | | 10 |
| Oil | Part by weight | 30 | 30 | 19 | 20 |
| Styrene component amount in diene rubber | wt % | 17 | 20 | 20 | 20 |
| Vinyl component amount in diene rubber | wt % | 19 | 22 | 22 | 22 |
| Tg of diene rubber | ° C. | −65 | −55 | −55 | −55 |
| Wet performance | Index value | 100 | 127 | 100 | 116 |
| Heat build-up | Index value | 88 | 100 | 97 | 99 |
| Performance on ice | Index value | 115 | 100 | 104 | 100 |
| Wear resistance | Index value | 100 | 100 | 110 | 102 |

The types of raw materials used as per Tables 1 and 2 are described below.

- SBR-1: solution polymerized styrene butadiene rubber, JSR HP755B, manufactured by JSR Corporation; an oil-extended product containing 41 wt % of the styrene component and 24 wt % of the vinyl component, and containing 37.5 parts by weight of the oil-extending component per 100 parts by weight of the styrene butadiene rubber
- SBR-2: solution polymerized styrene butadiene rubber, BUNA VSL 5025-2, manufactured by LANXESS; an oil-extended product containing 25 wt % of the styrene component and 50 wt % of the vinyl component, and containing 37.5 parts by weight of the oil-extending component per 100 parts by weight of the styrene butadiene rubber
- SBR-3: solution polymerized styrene butadiene rubber, Tufdene F3420, manufactured by Asahi Kasei Corporation; an oil-extended product containing 36 wt % of the styrene component and 26 wt % of the vinyl component, and containing 25 parts by weight of the oil-extending component per 100 parts by weight of the styrene butadiene rubber
- SBR-4: emulsion polymerized styrene butadiene rubber, SBR Nipol 1502, manufactured by Zeon Corporation; a non-oil-extended product containing 23.5 wt % of the styrene component and 11.5 wt % of the vinyl component
- BR-1: butadiene rubber, Nipol BR1220, manufactured by Japan Synthetic Rubber Co., Ltd.; containing 1 wt % of the vinyl component
- BR-2: butadiene rubber, Nipol BRX5000, manufactured by Japan Synthetic Rubber Co., Ltd.; a pre-blended butadiene rubber containing 1 wt % of the vinyl component; a pre-blended product in which 71 wt % of polybutadiene having a weight average molecular weight of 600,000 and 29 wt % of polybutadiene having a weight average molecular weight of 50,000 are mixed in a cyclohexane solvent
- NR: natural rubber, SIR20
- Silica-1: silica, Zeosil 1115MP, manufactured by Rhodia Operations; CTAB specific surface area=110 $m^2/g$
- Silica-2: silica, Zeosil Premium 200MP, manufactured by Rhodia Operations; CTAB specific surface area=210 $m^2/g$
- Carbon black: N339, manufactured by Cabot Japan K.K.
- Coupling agent: silane coupling agent, Si69, manufactured by Evonik
- Alkylsilane: octyltriethoxysilane, KBE-3083, manufactured by Shin-Etsu Chemical Co., Ltd.
- Terpene resin: aromatic modified terpene resin; YS Resin TO125, manufactured by Yasuhara Chemical Co., Ltd.
- Oil: Extract No. 4S, manufactured by Showa Shell Sekiyu K. K.

TABLE 3

Common components of the rubber compositions

| | |
|---|---|
| Zinc oxide | 4.0 Parts by weight |
| Stearic acid | 2.0 Parts by weight |
| Anti-aging agent | 2.0 Parts by weight |
| Wax | 2.0 Parts by weight |
| Sulfur | 1.5 Parts by weight |
| Vulcanization accelerator 1 | 1.5 Parts by weight |
| Vulcanization accelerator 2 | 0.3 Parts by weight |

The types of raw materials used as indicated in Table 3 are shown below.

- Zinc oxide: Zinc Oxide #3, manufactured by Seido Chemical Industry Co., Ltd.
- Stearic acid: Beads Stearic Acid YR, manufactured by NOF Corp.
- Anti-aging agent: 6PPD, manufactured by Flexsys
- Wax: paraffin wax, manufactured by Ouchi Shinko Chemical Industrial Co., Ltd.
- Sulfur: oil treated sulfur, manufactured by Hosoi Chemical Industry Co., Ltd.
- Vulcanization accelerator 1: Sanceller CM-G, manufactured by Sanshin Chemical Industry Co., Ltd.
- Vulcanization accelerator 2: Perkacit DPG grs, manufactured by Flexsys As is clear from Table 2, it was confirmed that the rubber compositions for use in tire treads of Working Examples 1 to 8 achieved excellent performance on ice, wet performance, and wear resistance. It was also confirmed that the rubber compositions of Working Examples 1 to 8 exhibited low heat build-up and excellent low rolling resistance.

As is clear from Table 1, the rubber composition of Comparative Example 2 caused deterioration in wet performance since the amount of the vinyl component in the diene rubber was greater than 28 wt % because only the SBR-2 was contained.

With the rubber composition of Comparative Example 3, wet performance and wear resistance were deteriorated since the CTAB specific surface area of the silica-1 was less than 150 $m^2/g$.

With the rubber composition of Comparative Example 4, performance on ice and wear resistance were deteriorated since the compounded amount of the silica was greater than 150 parts by weight. Furthermore, the rubber composition of Comparative Example 4 exhibited greater heat build-up and deteriorated rolling resistance.

With the rubber composition of Comparative Example 5, wet performance and performance on ice were deteriorated since the compounded amount of the silica was less than 80 parts by weight. Furthermore, the rubber composition of Comparative Example 5 exhibited greater heat build-up and deteriorated rolling resistance.

With the rubber composition of Comparative Example 6, performance on ice and wear resistance were deteriorated since alkylsilane (long chain alkyl group-containing silane compound) was not contained.

With the rubber composition of Comparative Example 7, wet performance and wear resistance were deteriorated since the compounded amount of the alkyl silane (long chain alkyl group-containing silane compound) was greater than 10 wt % of the amount of the silica.

With the rubber composition of Comparative Example 8, performance on ice and wear resistance were deteriorated since the compounded amount of the butadiene rubber was less than 40 wt % and the styrene component in the diene rubber was greater than 20 wt %.

The invention claimed is:

1. A rubber composition for use in a tire tread comprising: per 100 parts by weight of diene rubber containing 40 wt % or greater of butadiene rubber, and a styrene butadiene rubber,
    from 80 to 150 parts by weight of silica having a CTAB specific surface area of 180 to 250 m$^2$/g,
    an octyltriethoxysilane in an amount of 1 to 10 wt % of the amount of the silica, and
    from 3 to 20 parts by weight of aromatic modified terpene resin excluding terpene phenol resin;
    a total styrene amount based on 100 wt % of the diene rubber being from 17 to 20 wt %, and a total vinyl amount based on 100 wt % of the diene rubber being from 18 to 28 wt %; and
    an average glass transition temperature based on 100 wt % of the diene rubber being from −55° C. to −70° C.

2. The rubber composition for use in a tire tread according to claim 1, wherein at least a part of the butadiene rubber is a pre-blended butadiene rubber in which from 60 to 80 wt % of high molecular weight polybutadiene having a weight average molecular weight of 500,000 to 1,000,000 and from 20 to 40 wt % of low molecular weight polybutadiene having a weight average molecular weight of 6,000 to 60,000 are mixed in a solvent.

3. The rubber composition for use in a tire tread according to claim 1, wherein the diene rubber further contains a natural rubber.

4. The rubber composition for use in a tire tread according to claim 1, comprising, per 100 parts by weight of the diene rubber, from 125 to 150 parts by weight of the silica.

* * * * *